Jan. 15, 1946. H. T. AVERY 2,393,019
AUTOMATIC COUNTER REVERSE MECHANISM
Filed July 29, 1942 7 Sheets-Sheet 1

FIG_1_

INVENTOR
HAROLD T. AVERY
BY
ATTORNEYS

Jan. 15, 1946. H. T. AVERY 2,393,019
AUTOMATIC COUNTER REVERSE MECHANISM
Filed July 29, 1942 7 Sheets-Sheet 2

INVENTOR
HAROLD T. AVERY
BY
Taylor and Lasagne
ATTORNEYS

Jan. 15, 1946.    H. T. AVERY    2,393,019
AUTOMATIC COUNTER REVERSE MECHANISM
Filed July 29, 1942    7 Sheets-Sheet 3

INVENTOR
HAROLD T. AVERY
BY
ATTORNEYS

Jan. 15, 1946. H. T. AVERY 2,393,019
AUTOMATIC COUNTER REVERSE MECHANISM
Filed July 29, 1942 7 Sheets-Sheet 4

INVENTOR
HAROLD T. AVERY
BY
Naylor and Lavagnino
ATTORNEYS

Jan. 15, 1946.　　　H. T. AVERY　　　2,393,019
AUTOMATIC COUNTER REVERSE MECHANISM
Filed July 29, 1942　　　7 Sheets-Sheet 5

FIG_8_

FIG_9_

INVENTOR
HAROLD T. AVERY
BY
ATTORNEYS

Jan. 15, 1946.  H. T. AVERY  2,393,019
AUTOMATIC COUNTER REVERSE MECHANISM
Filed July 29, 1942  7 Sheets-Sheet 6

INVENTOR.
HAROLD T. AVERY
BY
ATTORNEYS

Jan. 15, 1946.    H. T. AVERY    2,393,019
AUTOMATIC COUNTER REVERSE MECHANISM
Filed July 29, 1942    7 Sheets-Sheet 7

INVENTOR
HAROLD T. AVERY
BY
ATTORNEYS

Patented Jan. 15, 1946

2,393,019

UNITED STATES PATENT OFFICE 2,393,019

AUTOMATIC COUNTER REVERSE MECHANISM

Harold T. Avery, Oakland, Calif., assignor to Marchant Calculating Machine Company, a corporation of California Application July 29, 1942, Serial No. 452,719

11 Claims. (Cl. 235—79)

The present invention relates to calculating machines and the like having registering means to display factors and results of calculations, and has particular reference to a machine of this class capable of performing the four cardinal calculations, and wherein the registering means may be set to display the result of the calculation either as a true figure or as a complement of that figure.

It is well known that in order to attain a true figure registration in multiplication operations it is necessary that the dials of the quotient and multiplier register, commonly known as the "counter dials," be driven in the same direction as the accumulator dials are driven, while to obtain a true figure registration of quotients in division operations it is necessary that the counter dials be driven in the opposite direction to that in which the accumulator dials are driven. On the other hand, in order to obtain a complementary registration of multipliers in multiplication operations, the counter dials must be driven in a direction opposite to that in which the accumulator dials are driven, while to obtain a complementary registration of quotients in division operations the counter dials must be driven in the same direction as the accumulator dials are driven.

Automatic control devices for insuring that the counter dials will be driven in the proper direction with respect to the accumulator dials in any selected class of calculation have previously been provided. In general, such devices are effective to set the counter reversing mechanism as an incident to the initiation of each calculation and to restore it to its initial setting at the conclusion of each calculation. This requires that such devices include both a counter reverse setting means and a counter reverse restoring means, rendering them complex in construction and also resulting in many useless operations of the setting means, the restoring means, and the counter reversing means, by reason of the fact that restoring and setting occur unnecessarily whenever calculations of the same class are performed in sequence.

It is the principal object of the present invention to simplify the operation of automatic control devices of this character by eliminating all unnecessary restoring operations.

A further object of the invention is to provide for restoration of the counter reversing means only upon initiation of an operation requiring such restoration.

A further object of the invention is to reduce the resistance to depression of a calculation initiation key.

The manner in which the above and other objects of the invention are accomplished will be readily understood on reference to the following specification when read in conjunction with the accompanying drawings, wherein.

General construction

Since the machine in which the present invention is embodied in its preferred form is disclosed in detail in the Avery Patent 2,216,659, to which reference may be made for a full disclosure of the machine as a whole, only a brief description of the operation of the same will be included herein.

Figures 6, 7:
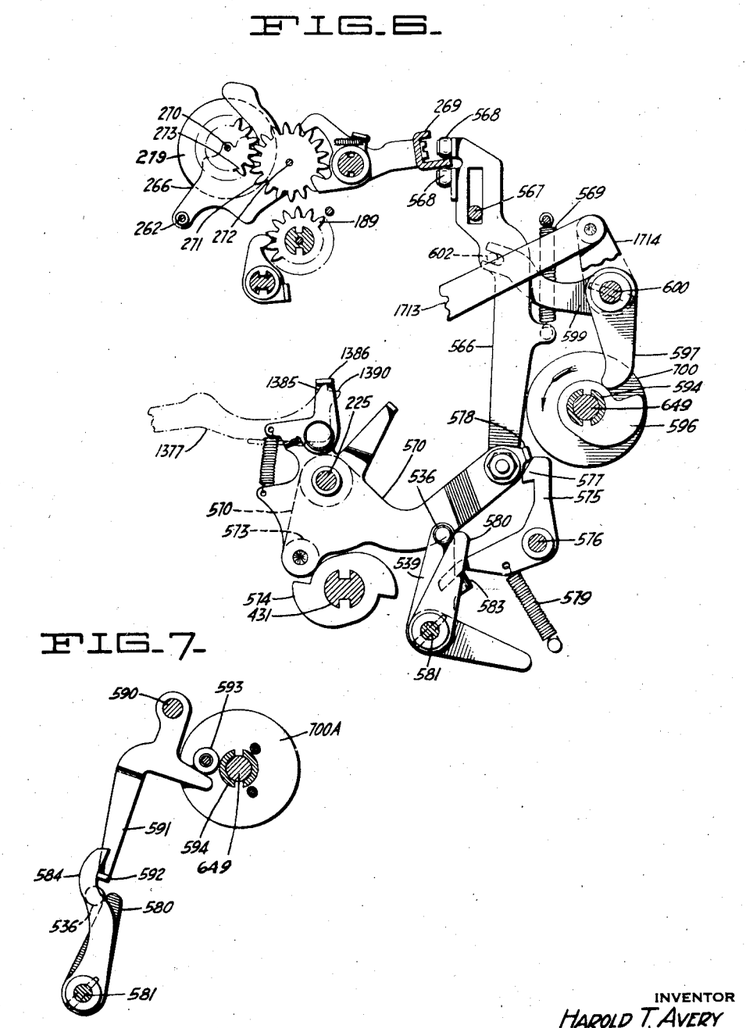
Figures 6 and 7 are side views illustrating the mechanism for dipping and latching the accumulator register with its driving gears meshing with the actuator gears.

The machine is of the proportional gear, selective speed, type, wherein there is provided a series of gear combinations (not shown) of different gear ratios in each order. The usual banks of keys 100 (Figure 1) are provided, one for each order, to control the connection of one of the gear combinations, depending on the value of a key depressed, to a cyclically operable actuator including a main clutch 428 (Figure 3) and thereby transmit rotation to a series of ordinally positioned drive gears 189 (Figure 6). During actuation, intermeshing gears 271 and 273 supported on pivot rods 272 and 270, respectively, carried by the carriage 250 and aligned with the various ordinal gears 189, are entrained with these gears to transmit rotation to accumulation dials 279 forming an accumulator register 318 (see Figure 1). As disclosed in the above mentioned Avery Patent Number 2,216,659, tens carrying mechanism (not shown) of the duplexing type is provided to effect tens transfer.

The ratios of the various above mentioned gear combinations are such that for each cycle of operation of the actuator, the dials 279 will each be driven at a rate of speed proportionate to the value of the depressed key 100 in line therewith, plus an added increment of one-tenth of the amount of rotation of the next lower order dial. Thus, during each cycle of operation of the main clutch 428 an amount corresponding to the amount set up in the keyboard will be entered into the accumulator register 318 and, through mechanism to be disclosed hereinafter, the number of cycles of operation of the main clutch in each carriage position will be entered into appropriate dials 1875 (Figure 12) of a counter register 1800 (see Figure 1) so that during division the counter register 1800 serves to register the quotient of a problem, while during multiplication the register 1800 registers the multiplier and, during addition, this register registers the number of additions performed.

Setting clutch control

Engagement of the main clutch is effected by a setting clutch 430 (Figure 2) keyed on a setting shaft 431 and adapted to be driven by the machine motor (not shown), when engaged. The setting clutch 430 is engaged through the instrumentality of any of a series of operation control keys such as the division key 970, and the add bar 800 (Figure 1) and, when so engaged, effects certain preliminary operations incident to the commencement of a calculation under power of the machine motor, besides causing engagement of the main clutch to effect actuation.

Figure 2:
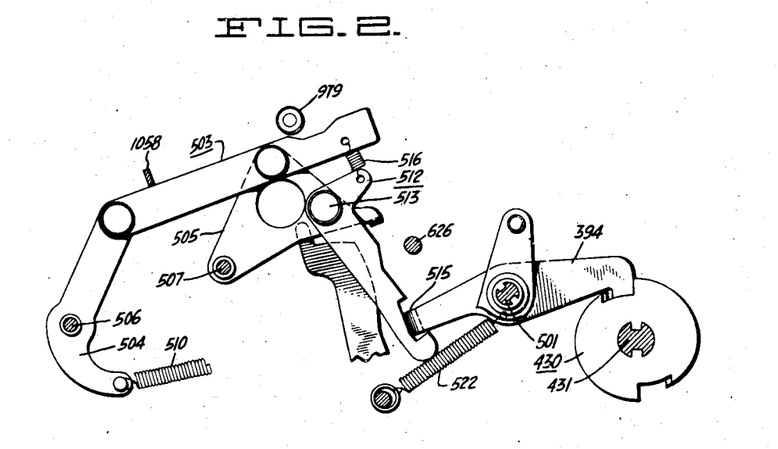
Figure 2 is a side view illustrating the setting clutch and controls therefor.

The setting clutch is normally held disengaged by a clutch dog 394 (Figure 2) which is keyed on a rockable shaft 501 and is urged clockwise by a spring 522 tensioned between the machine frame and the dog so as to urge its rightmost end, as viewed in Figure 2, into its illustrated position wherein it seats in one of a pair of diametrically opposed notches formed in the clutch 430, and holds the clutch disengaged from the motor drive.

To permit operation of the setting clutch by any one of several operation control mechanisms, a depressible operating bar 503 is provided which is supported by a parallel link arrangement comprising a lever 504 pivoted to the machine frame at 506 and a plate 505 pivoted to the frame at 507.

A spring 510 tensioned between the machine framework and the lever 504 normally maintains the bar in its illustrated raised position. A bell crank 512 pivoted to the plate 505 at 513 is normally held by means of a tension spring 516, extending between the bell crank 512 and the bar 503, in a position wherein a notch formed on the lower end thereof embraces an ear 515 on the clutch dog 394 so that upon depression of the bar 503 the bell crank 512 will rock the dog 394 out of the engaged notch of the setting clutch 430 causing the clutch to rotate the setting shaft 431.

Figure 5:
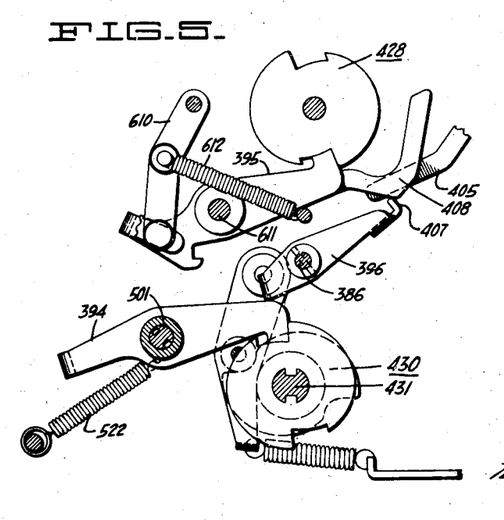
Figure 5 is a side view of the motor circuit control associated with the main clutch and the setting clutch.

Mechanism (not shown) is provided to release the crank 512 from the ear 515 during the first cycle of operation of the setting clutch so as to limit this clutch to a single cycle of operation regardless of how long the bar 503 is held depressed, and means (also not shown) are provided for closing the motor circuit upon rocking of the clutch dog 394. This means is actuated by a shaft 386 (Figure 5) having a lever 396 secured thereto and overlying the clutch dog 394 so as to be rocked thereby.

Main clutch control

The main clutch 428 (Figure 3) is normally held disengaged by a clutch dog 395 pivoted on a shaft 611 and urged into contact with one of a plurality of diametrically opposed notches in the clutch by a spring 612 tensioned between the machine frame and a toggle linkage 610 connected to the clutch dog 395.

To effect engagement of the main clutch under control of the setting clutch a cam 741 is keyed on the setting shaft 431 and engages a cam follower roller 745 mounted on a lever 746 pivoted on a shaft 501 and spring urged into engagement with the cam. An interponent 603 is pivotally mounted at 604 on the lever 746 and is normally held in the position illustrated in Figure 3 by a tension spring 613 extending between ears formed on the interponent and the lever 746, respectively. The interponent 603 has a tip 615 which is adapted to engage a notch 616 on the main clutch dog 395 and thereby, when the shaft 431 is rotated, rock the dog 395 out from whichever notch in the main clutch 428 it was seated and thereby cause the main clutch to transmit rotation from the motor drive to the actuator mechanism including the gears 189 (Figure 6).

To provide for continued multicyclic operation of the main clutch in certain calculations, as, for example, division, a latch 632 (Figure 3) is provided which is pinned to a rockable shaft 626 and urged clockwise by spring 633 into engagement with an ear 620 on the clutch dog 395. When the clutch dog 395 is rocked clockwise in division and other calculation operations a roller 634 mounted on the upper end of the latch 632 moves into latching engagement with the under edge of ear 620 and thereby holds the main clutch dog 395 from moving into engagement with the main clutch 428.

The main clutch dog 395 also maintains the motor circuit completed during operation of the main clutch 428. Upon rocking of the dog 395 to effect engagement of the main clutch an extension 408 thereon (Figure 5) engages an ear 407 on the aforementioned lever 396 to rock this lever clockwise and thereby close the motor circuit.

Dipping of accumulator register

Upon rotation of the setting shaft 431 and in advance of actuation by the main clutch 428, the various accumulator drive gears 271 (Figure 6)

carried by the shiftable carriage 250 (Figure 1) are enmeshed with the aligned actuator drive gears 189, described hereinbefore, this being accomplished by cams, one of which is shown at 574, keyed on the setting shaft 431.

The various sets of gears 271 and 273, as well as other elements (not shown) of the accumulator register, are carried on a series of plates 266 all pivoted by means of a rod 262 to the main body of the carriage, and all are connected at their rightmost ends, as viewed in Figure 6, to a common bail 269.

The means for raising and lowering the bail 269 to effect engagement and disengagement of the various gears 271 and 189 comprises a pair of links, one of which is shown at 566, slidable over pins 567 on spaced frame plates of the machine. Each link is provided with rollers 568 engaging the bail 269 on opposite sides thereof and is urged upwardly by a spring 569 tensioned between the links and a pin on the machine frame. The links 566 are pivoted to cam follower levers 570 rockable on a shaft 225, the levers 570 having rollers 573 engaging the cams 574 so that upon rotation of the shaft 431, the followers 570 and links 566 are moved to positively pull down the bail 269 against the action of the springs 569.

Means are provided to latch the accumulator register in its lower position during actuation. This means includes latch levers 575 pivoted at 576 to the machine frame and urged by springs 579 into latching engagement with ears 578 on the cam follower levers 570. When the various plates 266 and the mechanism carried thereby are dipped, the ears 578 ride over the noses 577 of the latch levers 575 and are latched therebeneath, thus retaining the gears 271 in mesh with the actuator gears 189 until termination of operation of the main clutch at which time the latches 575 will be released as will be described presently.

Referring to Figures 6 and 7, the means for releasing the latches 575 comprises levers 539 pinned on a rockable shaft coaxial with a shaft 581. On one of the levers 539 is a stud 536 engaged by an arm 580 pinned to shaft 581. Also pinned to shaft 581 is an arm 584 engaged by an ear 592 on an arm 591 pivotally supported on a shaft 590 and provided with an extension adapted to be engaged by a roller 593 carried by a supporting disc 700A which is fixed to a sleeve 594 rotatably mounted on a shaft 649. This sleeve 594 is driven by a separate clutch which is operated as an incident to termination of main clutch operations and is known as the "restore clutch."

*Restore clutch*

When the main clutch dog 395 is moved to stop and disengage the main clutch 428 (Figures 4 and 5), the restore clutch 700 (Figures 4 and 6), to be described hereinafter, starts operating and rotates the disc 700A (Figure 7). Movement of the roller 593 rocks the lever 591 clockwise to rock the lever 584 and so rock lever 580, which engages the pin 536 on the juxtaposed lever 539. Lateral extensions 583 on the levers 539 engage and rock tails formed on the latches 575 releasing the ears 578 and allowing the spring 569 to return the accumulator register mechanism to an upper position.

The sleeve 594 of the restore clutch 700 carries a cam 596 (Figure 6) which is employed to prevent the carriage from rising too rapidly under the action of the spring 569 whenever the latches 575 are released. The cam 596 is engaged by a cam follower lever 597 fixed to a rockable shaft 600. A pair of arms 599 also fixed to the shaft 600 are joined by pin and slot connections 602 to the links 566 so that the rate of rise of the accumulator register under the pull of springs 569 is no greater than that permitted by rotation of the cam 596.

The restore clutch 700 (Figures 4 and 6), besides effecting release of the carriage latch levers 575 and controlling the rate of return of the bail 269 and parts of the accumulator register to their upper positions also conditions certain of the division control mechanism, as will appear hereinafter, under the section entitled "Division control." The restore clutch is jointly controlled by the accumulator register dipping mechanism and by the main clutch dog in such a way that whenever the accumulator register is in its lower position and the main clutch dog 395 is seated in a notch of the main clutch, the restore clutch will engage and complete one cycle of operation.

The restore clutch is similar in internal construction to that disclosed in the patent to Friden Number 1,643,710 issued September 27, 1927, and is directly controlled by an extending nose 702 (Figure 4) on a clutch release dog in the form of a bell crank 405 which is freely supported on the shaft 600. An M-shaped lever 703 is provided to control the clutch release dog 405 and has one foot thereof pivotally mounted in the shaft 600. A short arm 704 extending from the lever 703 is provided with a tenon on which is positioned a compression spring 705 extending between the arm 704 and a tenon on the left arm of the clutch release dog 405.

An arm 722 keyed to the shaft 600, and thus rocked counter-clockwise by dipping movement of the accumulator, is connected to the M-shaped lever 703 by a combined compression-expansion link unit 723, as disclosed in detail in the above mentioned Avery Patent 2,216,659. The link unit 723 is composed of a pair of links 715 and 716, the former pivoted at one end thereof on a stud mounted on the arm 722 and the latter link 716 pivoted at one end thereof on a stud extending from the lever 703. The two links slide relative to each other and have elongated slots at the free ends thereof each slidable over the pivotal stud for the other link. A compression spring 714 is inserted in a pair of coextensive apertures formed in the two links, being positioned over opposed tenons extending from each link, and thereby opposes any attempt to lengthen or shorten the link unit beyond its normal length illustrated in Figure 4.

Now, at the start of a calculation, and as the setting clutch is rotated, the main clutch dog 395 is withdrawn from contact with the main clutch and extension 408 of the dog 395 is withdrawn from beneath an ear 710 on a latch lever 701 pivoted to the machine frame and urged counter-clockwise by a spring 717 tensioned between the latch lever and the machine frame. The latch 701 is therefore rocked counter-clockwise and an ear 718 thereon is rocked into a notch 719 formed in the M-shaped member 703 to prevent counter-clockwise movement of lever 703 until the main clutch has been disengaged by reseating of its dog 395 in one of the full cycle notches of the clutch 428. The lowering of the accumulator register mechanism (Figure 6), however, tends to engage the restore clutch even before the main clutch engages and a second restraining means is provided to prevent this operation.

The left foot of the lever 703 is provided with a shelf 720 overlying one end of a bell crank 721, pivoted on the shaft 611, and having a roller 707 at the other end thereof in engagement with a cam 708 keyed on the setting shaft 431. On rotation of the setting clutch, therefore, the bell crank 721 is rocked to raise the lever 703 and thus insure that the ear 718 of the latch member 701 will be able to engage the notch 719 properly when the main clutch is engaged. As the setting clutch continues through a single cycle of operation, the cams 574 (Figure 6) effect dipping of the accumulator register mechanism and, consequently, the shaft 600 is rocked counter-clockwise. Therefore, the arm 722 (Figure 4) keyed to the shaft 600, is lowered and the link unit 723 is lengthened against the opposition of its spring 714. The parts remain so positioned with the spring 714 compressed until the main clutch dog 395 is permitted to reseat in a notch of the clutch 428 whereupon the extension 408 thereon strikes the ear 710 of the latch lever 701, rocking it clockwise and removing its lug 718 from the notch 719 of the lever 703. Spring 714 then expands, shortening the link unit 723 and rocking the member 703 counter-clockwise to carry the left leg (Figure 4) of lever 703 down against the leftwardly extending arm of the bell crank 405 to rock this lever counter-clockwise and remove the nose 702 thereon from engagement with the restore clutch 700, thereby enabling the clutch to become engaged.

Figure 4:
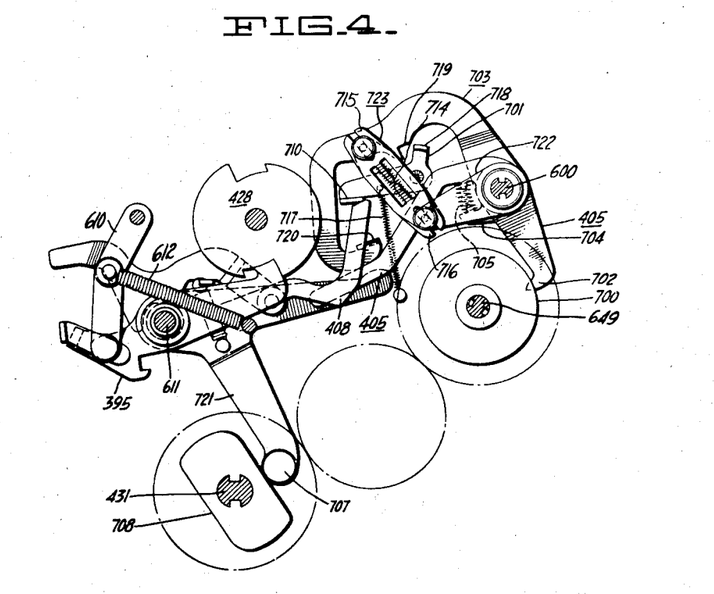
Figure 4 is a side view of the restore clutch and controls therefor.

Operation of the restore clutch, thus initiated, causes the latches 575 (Figure 6) to be released in the manner described in connection with Figures 6 and 7 and controls the rate of rise of the links 566 through the cam 596, as previously described, enabling the springs 569 to rock the shaft 600 and arm 722 (Figure 4). This movement of arm 722 tends to compress the spring 714 which, being stronger than the spring 705, transmits a rocking movement to the link 723 and lever 703 to compress the spring 705 until the nose 702 of the restore clutch dog 405 can reenter into an aperture of the housing of the restore clutch 700, whereupon the restore clutch becomes disengaged and the mechanisms are brought to rest in the position illustrated in Figure 4.

The restore clutch dog 405, when moved counter-clockwise to effect engagement of the restore clutch 700, causes the motor circuit to be closed. This is accomplished by the leftwardly extending arm of the dog 405 (see Figures 4 and 5) which engages the ear 407 on the lever 396 and rocks the shaft 386 clockwise to close the circuit of the motor.

*Division control*

Figure 1:
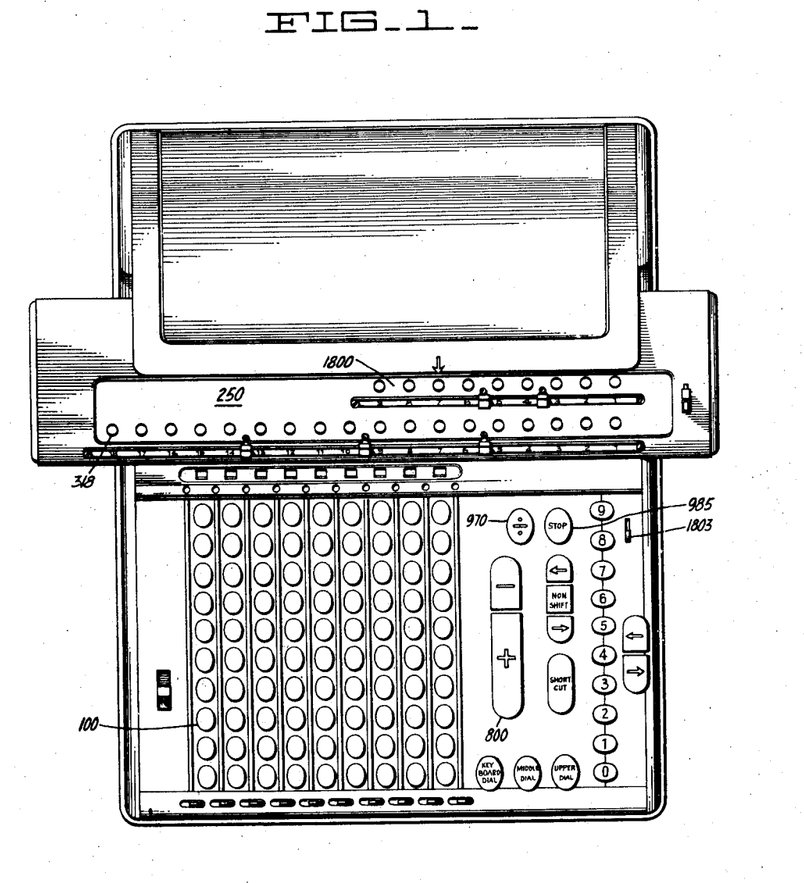
Figure 1 is a plan view of the calculating machine embodying the present invention.
Figure 9:
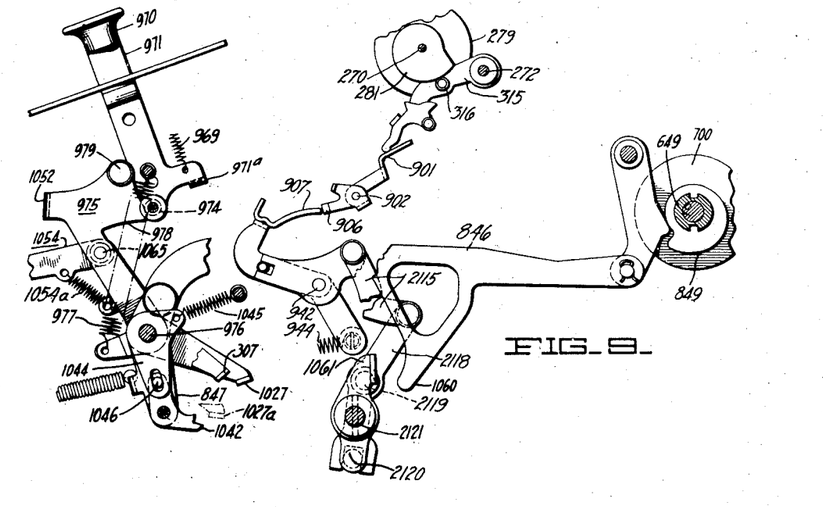
Figure 9 is a side view illustrating the control of the division control member by the division initiating key, the relationship between the division control member and the restore clutch mechanism, and the means controlled by the accumulator register for tripping the main clutch dog latch.
Figure 11:
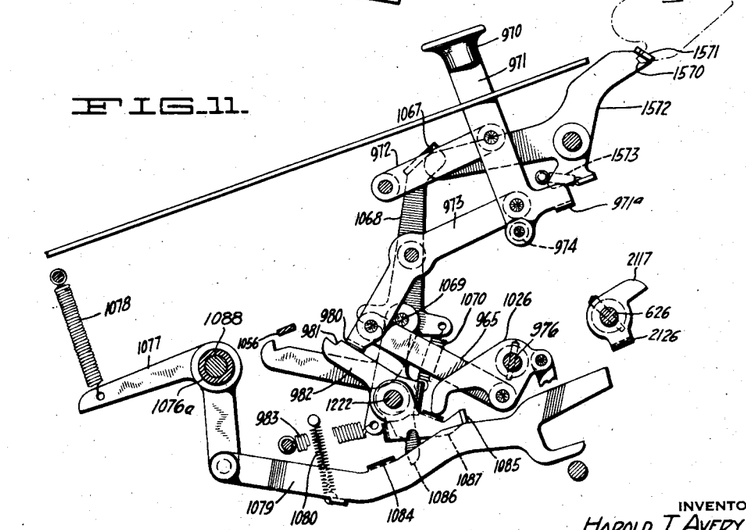
Figure 11 is a detail view illustrating part of the stop key mechanism and the division control mechanism.

As disclosed in detail in the above mentioned Avery Patent Number 2,216,659, division is performed by setting up the dividend in the accumulator register 318, as by the usual adding operation, and then setting up the divisor in the keyboard, and depressing the division initiating key 970 (Figures 1, 9, and 11). The machine thereupon carries out automatically the operation of dividing the divisor into the dividend and registering the quotient in the counter register 1800 carried by the shiftable carriage 250.

The division operation consists of successive subtractions of the divisor from those digits of the dividend which are registered in orders of the accumulator aligned with the portion of the selecting mechanism containing the divisor, and which may be called the "effective dividend."

The machine continues to subtract until the remainder in the "effective dividend" portion of the accumulator is reduced to a value substantially less than half the divisor whereupon the division control mechanism is automatically tripped for stopping the subtraction. Since the machine is arranged to stop actuation only in full cycle position, it proceeds through whatever fraction of a cycle may be necessary, after trip-off, in order to complete the particular cycle of negative actuation then in process, which causes the machine to subtract a corresponding fraction of the divisor (which fraction may be any amount up to the whole divisor) from the amount of the dividend remainder at the time of trip-off. Since that amount was at the time of trip-off substantially less than the divisor, the remainder at the end of this negative cycle may be either more or less than zero depending on whether the trip-off occurred early or late in the cycle of subtraction. If the remainder is less than zero the machine will, of course, be in an overdrafted condition.

Means are provided to sense the condition of the machine at this time and if it is in an overdrafted condition the sensing means will automatically cause a subsequent plus actuation cycle to be instituted to correct the overdrafted condition after which the carriage is automatically shifted one step to the left. However, if the remainder has not been reduced to less than zero at the end of the cycle the sensing mechanism will not effect the "corrective" plus actuation cycle but the carriage will, nevertheless, be shifted one step to the left.

As the carriage is automatically shifted on to the left, additional dividend digits in the accumulator register are successively brought into alignment with the part of the actuator mechanism controlled by the portion of the keyboard upon which the divisor is set and the above cycle of operations will continue until the carriage reaches its leftmost position. Since the construction and operation of the division control mechanism is described in detail in the above Avery Patent Number 2,216,659, only a brief description of the mechanism will be given herein.

The division initiating key 970 (Figure 11) is mounted on a key stem 971 supported by a pair of parallel levers 972 and 973 pivotally mounted on the machine frame. A roller 974 on the bottom end of the key stem 971 normally lies in front of a division control member 975 (see Figure 9). The member 975 is pivotally mounted on a shaft 976 and is urged clockwise by a strong spring 977 tensioned between an arm formed on the member 975 and a pin on the machine framework, thus normally holding the key 970 in its upper illustrated position by virtue of the friction created by the engagement of the rear face of member 975 with the roller 974.

When the division key is depressed, the roller 974 passes beneath the face 978 on the control member 975, allowing the spring 977 to rock the member 975 clockwise, whereupon a roller 979 at the top of the member 975 strikes the upper edge of the main operating bar 503 (Figure 2) and depresses the bar to effect engagement of the setting clutch 430 as described hereinbefore.

As the key 970 is depressed, an ear 980 (Figure 11) on the key supporting lever 973 is engaged by the latching shoulder 981 of a latch 982 pivoted on a shaft 1222 and pressed against the ear by a tension spring 983 extending between an offset portion of the latch 982 and a frame pin. Thus, the latch 982 becomes effective to hold the division key depressed.

Figures 2A, 3:
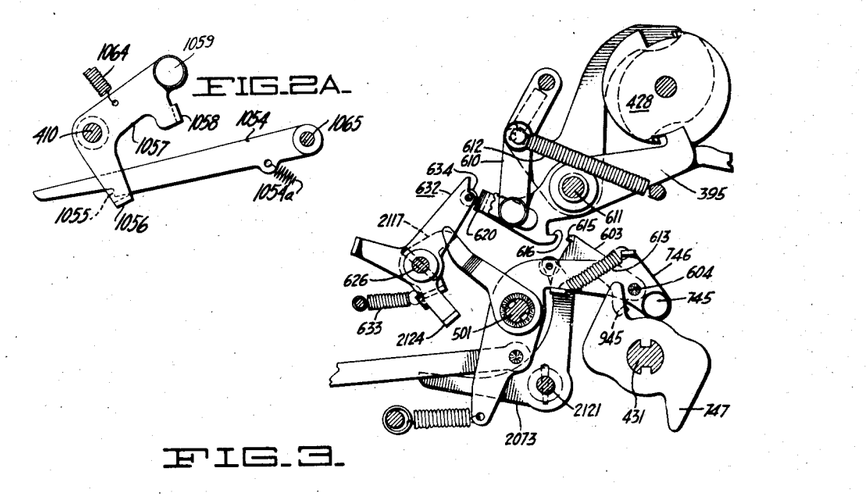
Figure 2A is a detail side view of the device operable during certain phases of division operations for causing engagement of the setting clutch.
Figure 3 is a side view of the main clutch and controls therefor.

The operation of the setting clutch 430 (Figure 2), initiated by the division control member 975, as described in the above mentioned Avery patent, effects dipping of the accumulator register and operation of the main clutch 428 (Figure 3). As the setting clutch operates to depress the links 566 (Figure 6) in the manner described hereinabove, the arms 599 are rocked to likewise rock the shaft 600 to which is attached an arm 1714. A link 1713 (Figures 6 and 12) is pivoted to the arm 1714 and is pivoted at its lower end by means of a stud 1712 to an arm 2098 free on a frame pin 2097. Thus, the link 1713 is moved to the left during the setting clutch cycle and a roller 1712' on the stud 1712 engages and rocks a lever 315 free on the pin 2097. The lever 315 is connected by a relatively heavy spring 316 to an ear 317 of an arm 318a which is fastened to the shaft 976 which, as will be described hereinafter, is rocked clockwise by the key 970 upon depression thereof. The spring 316 and lever 315 are so arranged that during depression of the division key, which results in clockwise rocking of the arm 318a from the position illustrated in Figure 12, the spring 316 will not be tensioned and will be ineffective to resist depression of the division key but will be moved by the arm 318a to position the lever 315 directly in front of the roller 1712' on the stud 1712. Thus, upon leftward movement of the roller 1712' during the succeeding setting clutch cycle, the lever 315 will be rocked counter-clockwise, tensioning the spring 316 and tending to return the division key to its upper position.

Figures 12, 13:
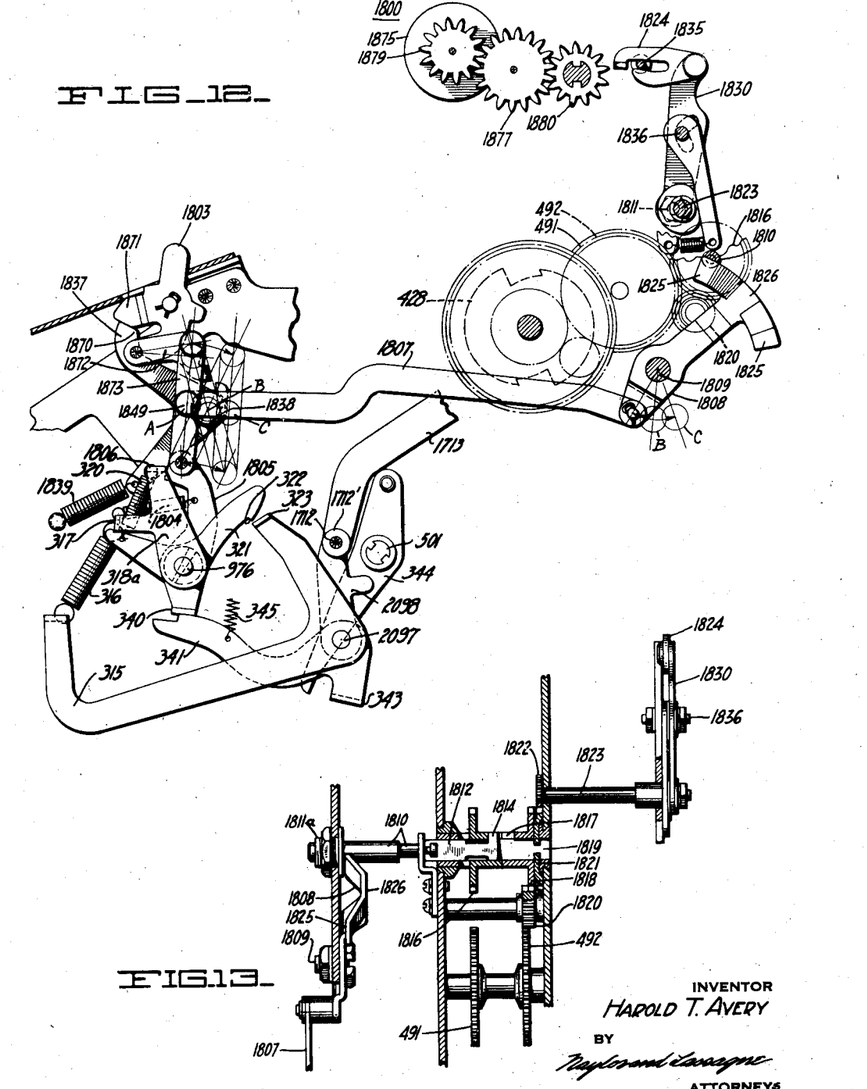
Figure 12 is a side view illustrating the counter, the actuator therefor, and the control means for the counter actuator constructed in accordance with the present invention.
Figure 13 is an end view, partly in section, illustrating the drive train and the control train for the counter actuator, including the reversing unit.

Means are provided to latch the lever 315 in its counter-clockwise rocked position only during division operations. A spring 320 is tensioned between an ear 1806 on the upper end of arm 318a and the tail of a latch 321 pivoted on the shaft 976 so as to normally hold the tail of the latch against the ear 317 of arm 318a. The latch 321 has a latching shoulder 322 adapted to fall in behind the ear 323 of lever 315 when the latter is rocked by the roller 1712' to hold the lever in a counter-clockwise rocked position, wherein the spring 316 is maintained tensioned. However, in machine operations other than division, the arm 318a will remain in its illustrated position since the division key is not depressed and the latch 321 will likewise remain in its illustrated position out of latching relation with the ear 323. It will be seen from the above that when the division key is depressed, rocking the arm 318a and latch 321 clockwise, the first setting cycle will cause the roller 1712' to rock the lever 315 counter-clockwise, tensioning the spring 316, until the ear 323 is latched by the latch 321.

In division calculations and after the main clutch dog 395 is rocked to institute operation of the main clutch, the spring 633 (Figure 3) will become active to hold the latch 632 in latching engagement with the clutch dog 395 to cause multicyclic operation of the main clutch. The actuator mechanism including the gears 189 (Figure 6) is conditioned to operate in a subtractive direction by the depression of the division key 970 in a manner described in the above Avery patent so that the divisor set up on the keyboard will be subtracted one or more times from the dividend remainder appearing in the accumulator register.

Sensing mechanism is continuously effective throughout the series of subtractive operations effected in each shifted position of the carriage to compare the continuously changing remainder with the divisor and to operate the automatic controls for terminating the subtractive operations when that remainder becomes substantially less than the divisor. This same sensing mechanism is subsequently employed in each carriage position to ascertain whether or not an overdraft has occurred. The sensing mechanism comprises a sensing lever 901 under control of each order of the keyboard (plus two additional levers located one and two orders to the left, respectively) each of which levers is arranged to cooperate with related mechanism positioned by the corresponding accumulator dial, but only the sensing lever controlled by the keyboard order which contains the highest significant digit of the divisor, and all sensing levers to the left thereof are permitted to come into operation. Means (not shown) is provided to hold the various sensing levers to the right of the said sensing lever out of controlling position. The orders in which the sensing levers are thus permitted to come into operation will be referred to as the "controlling orders."

As more fully described in the aforesaid Avery patent, during rotation of the active accumulator register dials 279 (Figure 9), a snail cam 281 connected to each of the dials will be rotated in a clockwise direction, and a cam follower 315 pivoted on the rod 272 and following its respective cam by means of a roller 316 will depress a shelf formed on a sensing lever 901 pivotally supported at 902, thus rocking the lever 901 clockwise. A foot 906 on one or more of the levers 901 is normally engaged during division by a division control bail 907 pivoted at 942 to the machine frame and urged clockwise by a spring 944 tensioned between the machine frame and an arm on the bail 907. A link 2115 is connected between an arm on the bail 907 and a lever 2118 pivoted at 2119 to the machine frame. The lever 2118 is connected through a pin and slot connection to an arm 2120 pinned on a shaft 2121.

Referring to Figure 3, a bell crank 2073, also pinned on the shaft 2121, has a leftwardly extending arm underlying an ear 2124 of the main clutch dog latch 632, so as to engage and rock the latch 632 out from under the ear 620 of the main clutch dog 395 upon tripping of the bail 907 by the sensing levers 901.

The position of the pivot 902 (Figure 9) of each of the controlling sensing levers 901 is controlled by the size of the digits in the controlling keyboard orders containing the divisor, as disclosed in detail in the above mentioned Avery Patent Number 2,216,659. That is, the position of each pivot 902 in the controlling orders is adjusted in a substantially vertical direction by an amount dependent upon the value of the divisor as set in the corresponding keyboard order, this amount being such that when the remainder in the accumulator dials is reduced to approximately one-half of the divisor, the cam 281 in the controlling order of the accumulator will have forced its cam follower 315 and, consequently, the corresponding sensing lever 901, to a position wherein the foot 906 on the sensing lever 901 passes above the rightwardly extending finger of the bail 907, permitting the spring 944 to rock the bail 907 clockwise and effect release of the latch 632 (Figure 3) so as to stop the main clutch.

It will be recalled that the main clutch dog 395 (Figures 4 and 5), when rocked home by its spring 612 will trip the latch 701 and allow the now extended link unit 723 to contract and rock the lever 703 and the restore clutch dog 405 counter-clockwise to cause engagement of the restore clutch.

Figure 8:
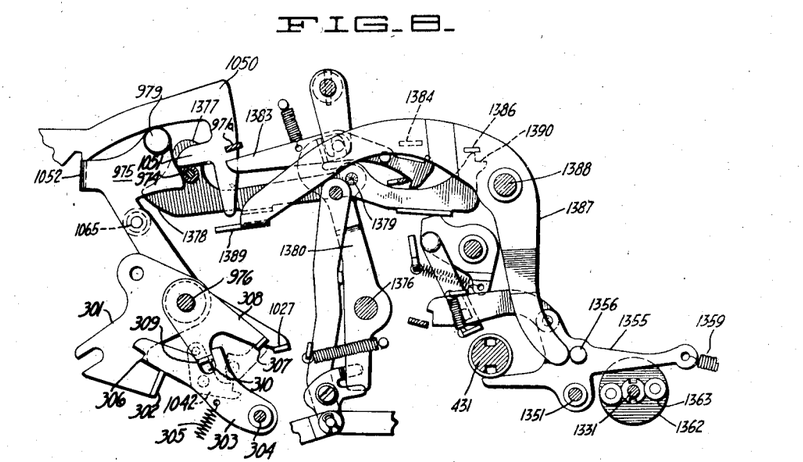
Figure 8 is a side view illustrating part of the division control mechanism, particularly that utilized in connection with control of the carriage shifting means.

During the restore clutch cycle and while the accumulator register is being raised, a link 846 (Figure 9) is moved to the left by a cam 849 driven by the restore clutch 700. A lever 847 pivoted on the shaft 976 and pivotally connected to the link 846 is rocked counter-clockwise. This lever 847 has a notched bell crank 1042 pivotally mounted thereon, and adapted to engage an ear 1027 extending from the division control member 975, so as to rock the member slightly further counter-clockwise than is illustrated in Figures 8 and 9, wherein it may be latched by a latch 1050 to be described hereinafter.

A second bell crank 1044, freely mounted on the shaft 976, has one end thereof provided with an elongated slot embracing a pin 1046 on the bell crank 1042. A spring 1045 tensioned between the other end of the bell crank 1044 and the frame holds the bell crank 1042 in position to engage the extension 1027 during the first part of the movement of the cam 849, providing the division control member 975 has been rocked clockwise of its illustrated position by spring 977 wherein the ear 1027 is located at 1027a, but causes the bell crank 1042 to be rocked counter-clockwise relative to the lever 847 upon continued movement of the cam 849 (if the member 975 is maintained in its illustrated position), so as to underride and miss the ear 1027. Thus, since the member 975 is in its clockwise rocked position during the repeated subtraction of the divisor from the dividend, the bell crank 1042 will engage the extension 1027 and will rock the member 975 counter-clockwise until an ear 1052 thereof is latched by a latchlever 1050 (Figure 8) which is pivoted at the left end thereof (in a manner not shown) to the machine frame and spring-pressed downwardly.

The division control member 975 is pivotally connected at 1065 to a link 1054 (Figures 2A and 9), which is urged counter-clockwise relative to the member 975 by a tension spring 1054a extending between the link and the member 975. Link 1054 has a shoulder 1055 adapted to engage an ear 1056 on a bell crank 1057 pivoted on a pin 410 and normally held in its illustrated position by a tension spring 1064 extending between the bell crank and the machine frame. An ear 1058 (see also Figure 2) on the bell crank 1057 overlies the setting clutch operating bar 503.

When the member 975 is first rocked clockwise upon depression of the division key 970, the link 1054 is carried rightward, thereby to allow the shoulder 1055 to drop to a position behind the ear 1056 on the bell crank 1057. Now, upon the succeeding restore clutch cycle, the cam 849 (Figure 9) causes the member 975 to be rocked counter-clockwise back to its original position and during this time the shoulder 1055 of the link 1054 engages the ear 1056 to rock the bell crank 1057 clockwise against the action of the spring 1064, causing the ear 1058 to depress the setting clutch operating bar 503 (Figure 2) and initiate a "corrective cycle" as described in detail in the above mentioned Avery Patent Number 2,216,659, to correct for an overstroke if such has occurred. Means (not shown) are provided to release the link 1054 from engagement with the ear 1056 of the bell crank 1057 during the succeeding setting clutch cycle so as to allow the parts to return to their illustrated position.

When the division control member 975 is rocked counter-clockwise by the action of the restore clutch 700, cam 849, link 846, lever 847, and the bell crank 1042, it is retained in a leftward position by a latch lever 1050 (Figure 8) which is pivoted at the left thereof in a manner not shown to the machine frame and is spring pressed downward to engage an ear 1052 on the division control member. The member 975 is thus held in this position during the remainder of the division operation in that particular order.

Operation of the restore clutch 700, furthermore, returns the division control bail 907 to substantially the position illustrated in Figure 9, so that it may be relatched by the various blocking tails 906 of the sensing levers if an overdraft has occurred.

Since the blocking tails 906 had been raised clear of division control bail 907 in all controlling orders of the machine at the time the bail was released to terminate negative operation (due to the remainder then being substantially less than the divisor), and, since the only change in dial registration subsequent to trip-off has been a further subtraction of a fractional part of the divisor, the remainder will now either be still less than it was at the time of trip-off (in which case blocking tails 906 will be raised even further clear of bail 907 and the bail will be free to be again rocked clockwise through its complete path of movement by the spring 944 to prevent a subsequent "corrective" plus cycle of actuation, as will be described presently), or an overdraft will have occurred bringing the higher order dails to register "9's," which being greater than the "0" divisor settings effective above the highest order of the divisor will cause the blocking tails 906 to block bail 907.

For the purpose of returning the bail 907 to its counter-clockwise position, the link 846 is provided with an extension 1060 (Figure 9) adapted, on leftward movement of the link, to rock an arm 1061 pinned on the shaft 2121 to which is also pinned the arm 2120, thereby causing the members 2118 and 2115 to rock the bail 907 counter-clockwise. As positioned at the end of the restore cycle, the cam 849 is so proportioned as to permit the link 846 to be spring returned toward the right, as viewed in Figure 9 and, if the bail 907 is not held at this time by any of the ordinally arranged locking tails 906, it will be allowed to rock completely through its path of movement under the urge of the spring 944 and thus cause the bell crank 2073 (Figure 3) to engage a lug 945 on the interponent 603 and rock the same downward with respect to the cam follower lever 746 so that, during the succeeding second setting clutch cycle in which the follower 746 is rocked by the cam 747, the member 603 will not engage the main clutch dog 395 and main clutch operation will not occur. If, however, the bail 907 is blocked by a blocking tail 906, the bell crank 2073 will not become effective to rock the member 603 to an ineffective position and a main clutch operation will therefore be instituted, means (not shown) being provided to limit the main clutch operation to one cycle. It will thus be seen that main clutch operation at this time depends on whether or not an overdraft has occurred, for if an overdraft has taken place it is necessary that a corrective main clutch cycle be instituted.

In view of the fact that the reversing device for controlling the direction of operation of the actuator, as well as the controls therefor are disclosed in detail in the above mentioned Avery Patent Number 2,216,659, such is not disclosed herein. However, it should be noted that the reversing device is set to cause the actuator to operate in a subtractive direction upon clockwise rocking of the member 975 at the initiation of the division operation by the roller 979 thereon. During the first restore clutch cycle the member 975 is returned counter-clockwise and the link 1054 (Figure 2A) thereon rocks bell crank 1057 as above described. As the bell crank 1057 rocks to cause engagement of the setting clutch for a possible correction cycle, a roller 1059 on the bell crank sets the reversing device to cause the actuator to operate in a positive direction in the event a main clutch cycle is instituted.

If a corrective cycle has been initiated the main clutch dog will arrest the operation of the main clutch after a single cycle of operation and will automatically institute a second restore clutch operation in the usual manner. If, however, such a corrective main clutch cycle is not initiated, the second restore clutch operation will be automatically instituted toward the end of the second setting clutch cycle, which setting clutch cycle, it will be recalled, was instituted by recocking of the division control member 975 (Figure 9). Since in the latter circumstances the main clutch dog 395 is not removed from the position in which it is shown in Figure 4, its extension 498 prevents any engagement of the member 701 in the notch 719 of the M-shaped member 703 controlling operation of the restore clutch, and as the accumulator mechanism is dipped to rock the shaft 600 counter-clockwise, engagement of the restore clutch is prevented only by the bell crank 721 which engages the ear 720 on the member 703. As the setting clutch cycle draws to a close, the cam 708 permits the bell crank 721 to recede from the ear 720, permitting the tension link unit 723 to cause engagement of the restore clutch.

Figure 10:
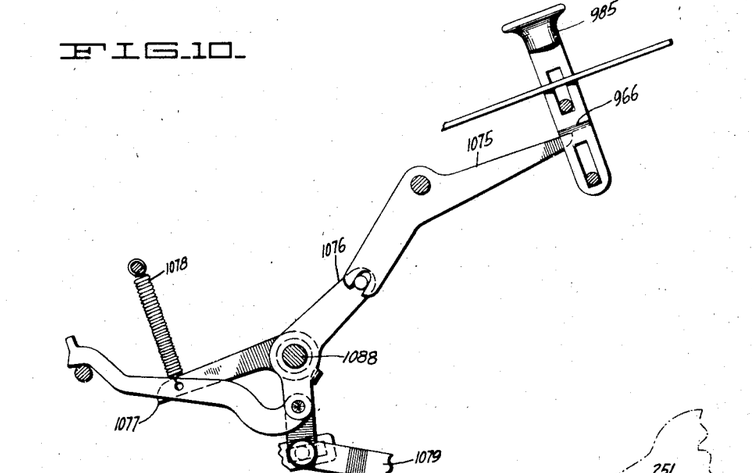
Figure 10 is a side view illustrating part of the stop key mechanism.

The second restore clutch operation controls the raising of the accumulator mechanism, as described hereinbefore, and initiates an automatic carriage shifting operation as will be described presently. During this second restore clutch cycle, the member 975 will have been held substantially in its illustrated position by the latch 1050 (Figure 8) as previously described, and consequently the extension 1027 thereof will not be engaged by the bell crank 1042 (Figure 9). It should be noted that the division key 970 (Figure 11) is still maintained in a depressed position at this time by the latch 982 (assuming the carriage has not yet reached its end position and that a special stop key 985 (Figures 1 and 10) has not been depressed), and will, therefore, not interfere with the subsequent clockwise rocking movement of the division control member 975.

*Carriage shift control in division*

A complete disclosure of the carriage shifting mechanism and controls thereof will be found in the aforementioned Avery patent, but the operation thereof will be briefly outlined herein in connection with the division mechanism.

Shifting of the carriage to the right or to the left is effected under motor power by a train of elements (not shown) including a shaft 1331 (Figure 8) which is rotatable one-half a revolution for each cycle of operation of the carriage shifting mechanism. Control means are provided for causing a leftward shift of the carriage in division and comprises an ear 1384 (Figure 8) which when moved to the left, institutes a leftward shift (in a manner not shown). This ear is adapted to be engaged by a hook formed on a floating dog 1383 pivoted on a lever 1380 which is pivoted on a shaft 1376. When the division key 970 (Figure 9) is depressed, an ear 971a on the stem 971 thereof engages the leftmost end of the dog 1383 and rocks the same counter-clockwise until it hooks the ear 1384.

A floating shift control lever 1377 is pivoted at 1379 to the lever 1380 and the leftmost end thereof, as viewed in Figure 8, is weighted so that it tends to rock counter-clockwise about its pivot 1379.

At the end of a division operation in a particular carriage position, the floating carriage shift control lever 1377 is moved to the left, as viewed in Figures 6 and 8, to initiate a carriage shift to the left. During the division operation in a certain carriage position an ear 1386 on one of the cam followers 570 is moved to the right of its position illustrated in Figures 6 and 8 by virtue of the dipping movement imparted to the links 566 by the cam followers 570 when rocked by the cams 574 so that the weighted left end of the lever 1377 will rock the lever counter-clockwise until the notch 1390 on the right hand edge thereof embraces the ear 1386. Now, as the final second restore clutch cycle in the current carriage order ensues, enabling the springs 569 to lift the links 566 and rock the cam followers 570 counter-clockwise, the floating lever 1377 is shifted to the left by the ear 1386 and the dog 1383 is likewise shifted to the left through the action of the lever 1380. Since the dog 1383 is at this time hooked over the ear 1384, the same will be moved to the left to institute a leftward shift of the carriage.

It should be understood that the above carriage shifting operation takes place at the end of the final second restore clutch operation in each carriage position following the corrective cycle instead of at the end of the first restore clutch operation. The carriage shift is prevented from taking place at the end of the first restore clutch cycle by reason of the fact that the division control member 975 is allowed to be held in a clockwise position by its spring 977 in which case a roller mounted on the pivot pin 1065 on member 975 engages the under surface 1378 of the shift control lever 1377 to hold the same rocked to position the notch 1390 thereof below the path of movement of the ear 1386 until after the restore clutch has operated sufficiently to allow the cam follower lever 570 to be rocked counter-clockwise and thereby move the ear 1386 to substantially its illustrated position wherein it cannot engage the notch 1390 and shift the floating lever 1377. During the final restore clutch cycle, however, the division control member 975, being latched in its counter-clockwise rocked position by the latch 1050, is ineffective to prevent initiation of the carriage shift.

During the initial shift cycle one of a pair of rollers 1363 (Figure 8) placed diametrically opposite each other on a disc 1362, which is rotated by the shaft 1331, rocks a lever 1355 pivoted to the frame stud 1351 against the action of a spring 1359, and a pin 1356 on this lever engages and rocks a bell crank 1387 pivoted to the machine frame at 1388. A shelf 1389 extending from the bell crank underlies the latch 1050 and the leftmost end of the lever 1377 so that the lever 1377 will be rocked from engagement with the ear 1386 to limit the shift operation to one step and the division control member 975 will be released by the latch 1050 to initiate the division operation in the new carriage order, and to again set the reversing device to cause the actuator to operate in a subtractive direction.

Termination of operation in division

The above repetitive tour of operations is repeated in each successive carriage position until the carriage reaches its leftmost position or the stop key 985 (Figures 1 and 10) is depressed, when further operation of the carriage shifting mechanism is prevented and the machine is brought to a standstill. As the carriage moves into its leftmost position, a projection 1570 (Figure 11) carried by the right hand carriage plate 251 strikes an inclined cam surface 1571 formed on a lever 1572 so as to rock the lever counter-clockwise against the action of a tension spring 1573 extending between the lever 1572 and the machine frame.

During a division operation, with the carriage in its leftmost position, the division key will be released from the restraint of the latch 982 (Figure 11). A leftwardly extending arm of the lever 1572 underlies an ear 1057 on the upper end of a bell crank 1068 pivoted at 1069 to the division key latch 982. When the lever 1572 is rocked counter-clockwise by the carriage, the bell crank 1068 is rocked by a spring 1070, extending between the bell crank and part of the division key latch 982 to hook a leftward extension thereof around the ear 1056 of the bell crank 1057 (Figure 2A). This bell crank, it will be recalled, is rocked by the link 1054 connected to the division control member 975 during the first restore cycle in each order, for the purpose of initiating a corrective cycle. If the end of the bell crank 1068 be hooked over the extension 1056 during such rocking, the bell crank 1068 will be pulled to the left during the first restore cycle rocking the latch lever 982 counter-clockwise about its supporting shaft 1222 to release the lateral extension 980 of the lever 973.

During the succeeding second restore clutch cycle a supplemental division key latch, which is provided for the primary purpose of performing certain functions related to the counter reverse control and is therefore described in connection therewith in this specification, is released and the division key 970 is returned to raised position bringing its roller 974 in front of member 975 to prevent resumption of subtractive operation. Thus the machine is brought to rest at the conclusion of a restore clutch cycle following the second setting clutch cycle, with or without an intervening corrective addition cycle of the actuator as previously described.

A division operation may be terminated at the conclusion of operation in any carriage position by a single depression of the stop key 985 (Figures 1 and 10) leaving a quotient digit in that order accurately registered, or it may be terminated at once by two successive depressions of the same key which may possibly leave an inaccurate quotient digit in the counter. The stop key 985 is slidably supported upon pins extending from the machine frame and is provided with an offset 966 which overlies a lever 1075 pivoted to the frame and connected by a pin and slot connection with a lever 1076 pivoted on a shaft 1088 and connected by means of a sleeve 1076a (Figure 11) with a bell crank 1077 which is normally urged in a clockwise direction by a tension spring 1078 extending between the bell crank 1077 and the machine frame. Upon depression of the stop key 985 the bell crank 1077 is rocked in a counter-clockwise direction and a link 1079 pivotally connected thereto and normally urged upwardly by a spring 1080, extending between a pin on the machine frame and the link 1079, is moved to the right. The link 1079 carries a shelf 1084 engageable with a tail 1086 of the division key latch 982 and is limited in its upward travel under tension of spring 1080 by an ear 1085 formed on a lever 1087. The lever 1087 is pivoted on the shaft 1222 which carries the division key latch 982, and has but a limited swinging movement relative to this latch so that for the present purpose it may be considered as an integral part of the latch. Upon depression of the stop key 985 the link 1079 is moved to the right carrying its shelf 1084 against the lower end of the tail 1086 of the division key latch 982. This swings the division key latch 982 counter-clockwise releasing the division key therefrom and, being released from the latch 982, the division key 970 is permitted to rise as soon as the final restore clutch cycle has taken place to trip the supplemental latch, as hereinafter described.

A second depression of the stop key after the latch 982 has been tripped also moves the link 1079 to the right. It will be recalled, however, that upon the first depression of the stop key the latch 982 was moved in a counter-clockwise direction. Thus, the lever 1087 was swung upwardly and its ear 1085 permitted the link 1079 to rise under the action of its spring 1080. This rise of the link 1079 is sufficient to position its right hand end in front of an ear 2126 on an extension of a lever 2117 fixed to the shaft 626. Thus, upon the second depression of stop key 985, the link 1079 engages the ear 2126 to rock the shaft 626.

Referring to Figure 3 it will be recalled that the latch 632 is also fixed to the shaft 626 so that movement of this shaft by the link 1079 will effect release of the main clutch dog 395 and thus immediately arrest operation of the main clutch, and a restore clutch operation will ensue followed by the usual corrective cycle and a final second restore cycle at which time the supplemental division key latch will be released to permit the division key to rise, as hereinafter described.

Control of counter mechanism in division

The machine of the present invention has a counter register 1800 carried by the carriage (Figures 1 and 12) to serve as a multiplier register in multiplication operations and a quotient register in division operations. The counter actuator is connected through a reversing mechanism with the main clutch whereby the character of the count registered by the counter may be selectively controlled.

Included in the drive for the counter actuator is a double integral idler 491—492 (Figure 13) suitably driven in time with the main clutch 428. The idler 491 is directly meshed with a gear 1816 journaled on a slotted shaft 1819 while the idler 492 is entrained through an idler 1820 with a second gear 1818 journaled on the shaft 1819. The gears 1816 and 1818 form a reversing mechanism one being driven in a direction opposite that of the other and each being adapted to be selectively keyed to the shaft 1819 to drive the same in either of the opposite directions.

A gear 1821, keyed on the shaft 1819, meshes with a gear 1822 fixed on a shaft 1823 which carries an eccentric 1811 (Figure 11). A lever 1830 (Figures 12 and 13) forming part of the counter actuator is journaled at its lower end on the eccentric 1811 and has an irregular slot guided over a frame pin 1836. Pivoted to the upper end of the lever 1830 is an actuator finger 1824 having a slot therein guided over a frame pin 1835. The finger 1824 has a tooth engageable with the gear 1880 entrained through an idler 1877 with a dial gear 1879 for driving an associated counter dial 1875, the latter being connected to the gear 1879 through a planetary gear arrangement not shown. The arrangement of the counter finger 1824 and the lever 1830 is such that for each cycle of operation of the main clutch the tooth of finger 1824 will engage between the teeth of the gear 1880 and advance the same an increment of one tooth space in one direction or another, depending upon which of the driven gears 1816 and 1818 is keyed to the shaft 1819, thus advancing the associated dial one unit of registration.

For the purpose of selectively keying one or another of the gears 1816 and 1818 to the shaft 1819, a key 1812 is slidable in the longitudinal slot in shaft 1819 and has a tooth 1814 engageable in slots 1817 formed in the juxtaposed hubs of gears 1816 and 1818. The key 1812 is connected to a shaft 1810 slidable in a bearing 1811a and having a notch formed therein and embracing a cam 1808 having two spaced camming faces 1825 aligned in a single plane, and a third intermediate camming face 1826 displaced in a second plane. The cam 1808 is pivoted on a stud 1809 and is connected by means of a link 1807 with a differentially settable link 1873, the link 1807 being connected to a stud 1849 located on the link 1873 midway between its ends, and adapted to be set thereby into any one of three positions, A, B, and C. The lower end of the differential link 1873 is pivoted to an arm 1805 free on the shaft 976 while the upper end of the link is connected to a settable member 1803 through a connecting link 1872. The member 1803 has a portion extending through a slot in the keyboard whereby it may be selectively manipulated into either of two positions.

A spring pawl 1837 is provided for pawling the member 1803 in either of its adjusted positions and is pivoted at 1838 and urged in a clockwise direction by a spring 1839. This pawl has a nose 1870 engaging a projection 1871 on the lever 1803 to retain it in either position in which it may be set.

The character of the registration in the counting register can be controlled by the member 1803. When this member is in its rearward position (to the right, as viewed in Figure 12), the counting register will give a direct registration or positive count of multipliers in multiplication and of quotients in division, while, when member 1803 is moved to its forward position the counting register will give a complementary registration or negative count of multipliers in multiplication and a complementary count of quotients in division.

In order to obtain a true figure multiplier registration or true item count in multiplication, or additive operations, it is necessary that the counter dials be driven in the same direction as the accumulator dials are driven; while to obtain a true figure registration of quotients in division operations it is necessary that the counter dials be driven in the opposite direction to that in which the accumulator dials are driven. This requires a reversal of the counter drive upon initiation of the division operation so that in whichever position lever 1803 stands, the interchange from the proper direction of actuation of the counter register for multiplication, et cetera, to the proper actuation thereof for division, is automatically secured. In the present machine, this is accomplished without moving the lever 1803 from its set position by automatically shifting the arm 1805 and the lower end of link 1873 to their alternate rearward position at the start of the division calculation.

According to the present invention, this is accomplished by the arm 318a (Figure 12) secured to the shaft 976, which shaft, as shown in Figure 11, is connected to the division key 970 by member 1025 fixed to the shaft 976, link 965 pivotally connected at one end to the member 1026, and lever 973 pivotally mounted on the machine frame and pivotally connected adjacent its opposite ends to the link 965 and the stem 971 of key 970, respectively. This arrangement is such that upon depression of the key 970, shaft 976 will be rocked clockwise as viewed in both Figure 11 and Figure 12, carrying an ear 1806 on the upper end of arm 318a into engagement with the left edge of arm 1805 and rocking the latter clockwise.

Arm 1805 is releasably retained in the position to which it is thus moved, by a latch 341 held in engagement with an ear 340 on the lower end of arm 1805 by a spring 345 tensioned between the latch 341 and the frame, and notched to engage the gear 340 for the purpose of holding the arm 1805 in the position to which it is moved by the key 970 upon depression thereof. This arm 318a may be returned to the position in which it is shown in Figure 12, as the division key rises without effecting restoration of arm 1805, and unless arm 1805 is thereafter restored to the position in which it is shown in Figure 12 by the restoring mechanism hereinafter described, it will be held by latch 341 in the position to which it was moved by depression of the division key after the latter has been restored to raised position and the division operation has terminated. Under such circumstances, if the next calculation is a division operation, no adjustment of arm 1805 by arm 318a will take place.

Means conditioned by restoration of the division key to raised position and controlled by independently actuated mechanism, are provided for restoring the counter reversing mechanism from its division setting to its normal setting.

For this purpose a spring 1804, which is relatively light and easily overcome by the spring 316 which raises the division key, is tensioned between the arm 1805 and the ear 317 of arm 318a, this arrangement being such that the raising of the division key will tension spring 1804 by rocking arm 318a counter-clockwise while arm 1805 is held by latch 341. During each setting clutch cycle the ear 340 of arm 1805 is released by latch 341 by a member 344 keyed to the setting clutch dog shaft 501 (see also Figure 2) which is rocked by the setting clutch dog 394 keyed thereto as an incident to the initiation of each setting clutch cycle. The lower end of member 344 during such movement thereof engages an ear 343 on the tail of latch 341 and rocks the latter out of restraining relationship with the ear 340 of arm 1805.

However, during a division operation the arm 1805 is prevented from rocking counter-clockwise to its illustrated position upon release of latch 341 by virtue of the fact that the division key is held depressed during the division performance causing the arm 318a to maintain the arm 1805 in a clockwise rocked position so that the latch 341 may again fall into latching engagement with the ear 340. At the end of the division performance and after the last setting clutch cycle, the division key is allowed to be raised as disclosed hereinafter, leaving the arm 1805 and the rest of the counter control mechanism held by the latch 341, and tensioning the spring 1894 due to the counter-clockwise rocking of arm 318a. As the division key rises the roller 974 (Figures 8, 9, and 11) strikes a foot 1051 on the latch 1050 and causes the same to release the member 975 so that the friction set up between the member and the key will hold the same against the action of the spring 1804.

If the next machine operation is any other than a division performance, the setting clutch dog 394 upon instituting the first setting clutch cycle will cause the shaft 501 and lever 344 to rock counter-clockwise and release the latch 341 sufficiently in advance of any actuation of the dials so that the spring 1804 will return the arm 1805 and link 1873 to the left and the counter will be driven in the same direction as the accumulator.

If, however, the next machine operation is a division performance, the division key and its linkage will have caused the lever 318a to rock into holding engagement with the arm 1805 before the setting clutch dog 394 becomes effective to cause lever 344 to trip the latch 341, and the arm 1805 will not be restored as above described.

In the particular machine disclosed in the aforesaid Avery patent, the latch 982 (Figure 11) holding the division key 970 depressed is released concurrently with the leftward movement of member 975 (Figure 9) prior to the last setting clutch cycle in terminating a division operation. Therefore it is necessary in applying the present invention to such a machine to provide a supplemental latch which will hold the arm 318a (Figure 12) in the position to which it is moved by the division key upon depression thereof until the latch 341 has reengaged the ear 340, for otherwise the release of latch 341 from ear 340 during the last setting clutch cycle would permit spring 1804 to restore the counter reverse mechanism from its division setting to its normal setting prior to the corrective addition cycle which will follow the last setting clutch cycle if an overdraft is registered, and the resulting quotient registration would be erroneous. In applying the present invention to a machine in which the division initiation member is not released or restored until registration has been completed, however, it will be apparent that no such supplemental latch is required.

The supplemental latch of the present disclosure comprises a latch 303 (Figure 8) pivotally mounted on a frame stud 304 and rocked by a spring 305 so that its notched end 306 will engage an ear 302 of a member 301 fixed to shaft 976 when said shaft is rocked clockwise by the division key 970 as hereinbefore described.

Means are provided for releasing this supplemental latch during the second and last restore clutch cycle in each carriage position, but it should be noted that when the division key 970 is held depressed by its main latch 982, as hereinbefore described, the ear 302 is so spaced from the notch 306 as to permit the latch 303 to be moved back into engaging relationship with said ear when the restore cycle is completed. However, when the latch 982 is released, ear 302 moves snugly into notch 306 and reengagement of latch 982 is prevented. Under these circumstances the release of latch 303 is effective to completely release key 970 and permit it to rise.

The releasing means for latch 303 comprises a latch operating member 308 (Figure 8) freely pivoted on shaft 976 and provided with an ear 309 engaged in a notch 310 in latch 303 so that counter-clockwise movement of member 308 will cause clockwise movement of latch 303. Latch operating member 308 is also provided with an ear 307 lying in the path traversed by the previously described pawl 1042 (Figure 9) when the member 975 occupies the position in which it is shown in Figures 8 and 9.

During the first restore clutch cycle in each carriage position the pawl 1042 engages the ear 1027 of member 975 for the purpose of restoring the latter to the position in which it is shown in Figures 8 and 9, and the pawl is thereby guided so as to miss ear 307. During the second restore clutch cycle in each carriage position, however, the member 975 is being held in the position in which it is shown in Figures 8 and 9 and pawl 1042 engages ear 307.

If latch 982 has been previously released, as above described, the release of latch 303 thus accomplished will permit the key 970 to be moved to raised position by spring 316 (Figure 12) and upon its arrival at raised position latch 321 will be rocked by the impingement of ear 317 against the tail of the latch, thus discharging spring 316 completely and removing the resistance which it would otherwise offer to depression of the division key.

I claim:

1. In a calculating machine, the combination with automatic calculation control mechanisms including a plurality of settable operation control members; a reversible registering mechanism, and means for reversing said registering mechanism including a settable direction control member; of means controlled by one of said operation control members upon setting thereof for setting said direction control member, means for restoring said direction control member from set position, means operable as an incident to the initiation of operation of the machine for actuating said restoring means, means controlled by said one of said operation control members upon setting thereof for rendering said restoring means ineffective, and means operable as an incident to termination of operation of the machine for restoring said one of said operation control members from set position.

2. In a calculating machine, the combination with automatic calculation control mechanisms including a plurality of settable operation control members; a reversible registering mechanism, and means for reversing said registering mechanism including a settable direction control member; of means controlled by one of said operation control members upon setting thereof for setting said direction control member, means comprising a detent operable to hold said direction control member in set position, means for releasing said direction control member from said detent and restoring the same from set position, means operable as an incident to the initiation of operation of the machine for actuating said releasing and restoring means; the aforesaid setting means being effective, while said one of said operation control members remains set, to prevent movement of said direction control member from set position.

3. In a calculating machine, the combination with mechanism for conditioning the machine for a calculation, automatic calculation mechanisms including a plurality of settable operation control members; a reversible registering mechanism, and means for reversing said registering mechanism including a settable direction control member; of means controlled by a first one of said operation control members upon setting thereof for setting said direction control member, means responsive to each of a plurality of said operation control members for controlling said conditioning mechanism, means controlled by said conditioning mechanism upon operation thereof for restoring said direction control member from set position, means controlled by said first one of said operation control members upon setting thereof for rendering said last mentioned means ineffective, and means operable as an incident to termination of operation of the machine for restoring said first one of said operation control members from set position.

4. In a calculating machine, the combination with mechanism for conditioning the machine for a calculation, automatic calculation control mechanisms including a plurality of settable operation control members; a reversible registering mechanism, and means for reversing said registering mechanism including a settable direction control member; of means controlled by a first one of said operation control members upon setting thereof for setting said direction control member and holding the same in set position, means responsive to each of a plurality of said operation control members for controlling said conditioning mechanism, spring means energized by said conditioning mechanism for restoring said direction control member from set position, means including a detent operable to hold said direction control member in set position against said spring means, and means operable by said conditioning mechanism for releasing said direction control member from said detent.

5. In a calculating machine, the combination with automatic calculating mechanism including a plurality of settable operation control members; a reversible registering mechanism, and means for reversing said registering mechanism including a settable direction control member; of means controlled by a first one of said operation control members upon setting thereof for setting said direction control member, means including a detent for holding said direction control member in set position, means responsive to each of a plurality of said operation control members upon operation thereof for momentarily releasing said direction control member from said detent, means other than said detent controlled by said first one of said operation control members upon setting thereof for holding said direction control member in set position, spring means for restoring said direction control member from set position, means operable as an incident to termination of operation of the machine for restoring said first one of said operation control members from set position, and means operable by said first one of said operation control members upon restoration from set position for energizing said spring means.

6. In a calculating machine, the combination with machine operating means including a clutch, automatic division control mechanism including a settable division key for controlling operation of said operating means to perform a division calculation; control mechanism including a second settable key for controlling said operating means to perform a calculation other than a division calculation; a reversible counter mechanism, means responsive to said division key upon setting thereof for reversing said counter mechanism, and means operable as an incident to termination of operation of the machine for restoring said division key from set position; of means for holding said counter mechanism in reverse condition, spring means for restoring said counter mechanism from reverse condition, means operable by said clutch for energizing said spring means, and means controlled by said clutch for releasing said counter mechanism from said holding means; the aforesaid means responsive to said division key being effective, while said key remains set, to hold said counter mechanism in reverse condition.

7. In a motor driven calculating machine, the combination with automatic division control mechanism including a settable division key for controlling said machine to perform a division calculation; control mechanism including a second settable key for controlling said machine to perform a calculation other than a division calculation; a counter mechanism normally conditioned to register multiplier factors and reversible to register quotients, means responsive to said division key upon setting thereof for reversing said counter mechanism and holding the same in reversed condition, means operable as an incident to termination of operation of the machine for restoring said division key from set position; of means for retaining said counter mechanism in reverse condition after restoration of said division key from set position, and means for restoring said counter mechanism to normal condition comprising devices operable by power derived from the motor and as an incident to initiation of operation of the machine for releasing said counter mechanism from said retaining means.

8. In a calculating machine, the combination with calculation control mechanism including a first settable control member for controlling the machine to perform one type of calculation; calculation control mechanism including a second settable control member for controlling the machine to perform a second type of calculation; a reversible counter mechanism, means responsive to said first control member upon setting thereof for reversing said counter mechanism, and means for holding said first control member in set position; of means for holding said counter mechanism in reverse condition, means operable as an incident to termination of operation of said machine under control of said first mentioned calculation control member for releasing said first member from said first mentioned holding means, and means operable as an incident to the initiation of operation of the machine for releasing said counter mechanism from said last mentioned holding means; the aforesaid means responsive to said first control member being effective, while said member remains set, to hold said counter mechanism in reverse condition.

9. In a calculating machine, the combination with automatic calculation control mechanisms having a settable control member; means for holding said member in set position, spring means for restoring said member from set position, a reversible counter mechanism, and means responsive to said control member upon setting thereof for reversing said counter mechanism; of means responsive to said member upon setting thereof for energizing said spring means, means for holding said spring means energized, means operable as an incident to termination of operation of said machine under control of said control member for releasing said member from said first mentioned holding means, means for holding said counter mechanism in reverse condition, second spring means for restoring said counter mechanism from reverse condition after restoration of said control member, means controlled by said first mentioned spring means upon restoration of said control member thereby for energizing said second spring means, and means operable as an incident to the initiation of operation of the machine for releasing said counter mechanism from said last mentioned holding means.

10. In a calculating machine, the combination with automatic division control mechanism including a settable division key for controlling said machine to perform a division calculation; control mechanism including a second settable key for controlling said machine to perform a calculation other than a division calculation; a reversible counter mechanism, means responsive to said division key upon setting thereof for reversing said counter mechanism, and means operable as an incident to termination of operation of the machine for restoring said division key from set position; of means for holding said counter mechanism in reverse condition, spring means for restoring said counter mechanism from reverse condition, means operable by the machine for energizing said spring means, and means operable as an incident to the initiation of operation of the machine for releasing said counter mechanism from said holding means; the aforesaid means responsive to said division key being effective, while said key remains set, to hold said counter mechanism in reverse condition.

11. In a motor driven calculating machine, the combination with automatic division control mechanism including a settable division key for controlling said machine to perform a division calculation; control mechanism including a second settable key for controlling said machine to perform a calculation other than a division calculation; a counter mechanism normally conditioned to register multiplier factors and reversible to register quotients, means responsive to said division key upon setting thereof for reversing said counter mechanism, and means operable as an incident to termination of operation of the machine for restoring said division key from set position; of means for holding said counter mechanism in reverse condition, spring means for restoring said counter mechanism from reverse condition, means responsive to said division key restoring means upon operation thereof for energizing said spring means, and means for restoring said counter mechanism to normal condition comprising devices operable by power derived from the motor and as an incident to initiation of operation of the machine for releasing said counter mechanism from said holding means.

HAROLD T. AVERY.